Patented May 13, 1930

1,758,293

UNITED STATES PATENT OFFICE

WILLIAM S. MURRAY, OF UTICA, NEW YORK, ASSIGNOR TO ONEIDA COMMUNITY LIMITED, OF ONEIDA, NEW YORK, A CORPORATION OF NEW YORK

TARNISH-RESISTING SILVER AND SILVER PLATE AND PROCESS FOR PRODUCING THE SAME

No Drawing. Application filed September 19, 1924, Serial No. 738,721. Renewed October 3, 1929.

This invention relates to improvements in silver and silver plated articles and to processes for the treatment of such articles to render them tarnish resistant.

One of the difficulties in such articles is their tendency to tarnish which is a source of considerable inconvenience and expense to dealers and to users of such articles in that frequent cleaning, as by rubbing, polishing, etc., is necessary to remove the tarnish and restore the articles to their original color and luster.

It is the object of the present invention to provide a method of treating such articles so as to render them tarnish resistant.

The invention also includes a silver or silver plated article treated and containing the tarnish resistant or protective agent used, the quantity thereof absorbed by or present in the silver or silver plate depending upon the quantity of the agent used and the conditions under which it is used.

This is accomplished by the treatment of the silver or silver plate, with an element of the halogen group. The one I now prefer, however, is iodine because, up to the present time, that has given the best results.

The following examples of processes practiced by me will suffice for an understanding of the invention. Before stating these, however, it should be stated that the silver or silver plated article to be treated is suitably cleaned for treatment, as, for example, by scouring with pumice and water, followed by rinsing in cold running water and then in distilled water.

Example I.—Iodine

A solution is made up of 40 grammes of potassium iodine and 20 grammes of iodine per liter of water.

The silver or silver plated article is then immersed in this solution for about one hour.

It is then taken out, rinsed in cold running water and then in distilled water.

It is then cleaned by rinsing in cold running water and scouring on a brush wheel with pumice and water.

It is then rinsed in cold running water and then in distilled water and dried.

The treated article then, generally, is further cleaned with water and pumice, preceded, if desired or necessary, by soaking in some suitable reagent, for example, a strong solution of potassium iodide, for the removal of any surface discoloration.

Example II.—Chlorine

A sufficient quantity of silver chloride to make up a bath for the articles to be treated is placed in a crucible and fused.

The article to be treated is plunged into this bath and kept there until its surface is wet, say for about 30 minutes.

The article thus treated is then removed and cleaned by scouring on a brush wheel with pumice and water. It is then again washed in cold running water and in distilled water and dried.

Example III.—Bromine

A suitable quantity of liquid bromine is introduced into a dessicator. The article to be treated is then suspended in the dessicator above and out of contact with the liquid bromine. The dessicator is then covered tightly and thus freed from air circulation. The liquid bromine quickly gassifies and the article suspended therein absorbs the bromine. The extent to which the bromine is thus absorbed depends, among other things, upon the length of time the article is exposed to the gas. I have found that good results are attained by an exposure of about 17 hours, operating at room temperature.

The article is then removed from the dessicator and cleaned by scouring with wet pumice and rinsing in cold running water and then in distilled water. It is then dried.

Although the cleansing of the treated article produced in accordance with the procedure stated in the three foregoing examples by the use of water and pumice, as above described, has been found satisfactory, other cleansing means may be used in place of or in addition to the pumice and water, as, for example, chemical reagents, if, for any reason, it should be found desirable or necessary to do so.

Example IV.—Iodine

The silver article to be treated is placed in an air-tight container which is heated to about 350° F.

Iodine is then introduced into the container and vaporized therein.

The article to be treated is exposed to the iodine vapor for about an hour and a half.

It is then removed therefrom and cleansed as heretofore stated in connection with other examples.

Example V.—Chlorine

The article to be treated is introduced into an air-tight container. Chlorine gas is then introduced into this container at the top and removed therefrom at the bottom. The article to be treated is subjected to the chlorine gas for about 30 minutes more or less.

The article thus treated is then removed and cleansed as heretofore described in connection with other examples.

Example VI.—Bromine

A sufficient quantity of bromine water is introduced into a suitable container and the article to be treated immersed therein for about one-half hour, more or less.

It is then removed and cleansed as heretofore described in connection with other examples.

As before stated, the article treated may be silver or silver plate. For brevity, the term "silver" as used in the accompanying claims includes both.

What I claim is:

1. A new article of manufacture, silver impregnated with and containing a halogen element.

2. A new article of manufacture, silver impregnated with and containing iodine.

3. The process of treating silver to render it tarnish resisting which consists in subjecting the silver to the action of and impregnating it with a halogen element.

4. The process of treating silver to render it tarnish resisting which consists in subjecting the silver to the action of and impregnating it with iodine.

5. The process of treating silver to render it tarnish resisting which consists in subjecting the silver to the action of a fluid containing a halogen element.

6. The process of treating silver to render it tarnish resisting which consists in subjecting the silver to the action of a fluid containing iodine.

7. The process of treating silver to render it tarnish resisting which consists in subjecting the silver to the action of a fused bath containing a halogen element.

In testimony whereof, I have hereunto set my hand.

WILLIAM S. MURRAY.